United States Patent
Chang et al.

(10) Patent No.: US 8,213,282 B1
(45) Date of Patent: Jul. 3, 2012

(54) METHOD FOR IDENTIFYING OPTICAL DISK TYPE

(75) Inventors: Cheng-Hsien Chang, Hsinchu (TW); Ya-Hsin Ching, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 1192 days.

(21) Appl. No.: 11/760,929

(22) Filed: Jun. 11, 2007

Related U.S. Application Data (60) Provisional application No. 60/827,890, filed on Oct. 3, 2006.

(51) Int. Cl.
G11B 20/18 (2006.01)

(52) U.S. Cl. .................................... 369/53.2; 369/53.41

(58) Field of Classification Search .................. 369/53.2, 369/53.22, 53.23, 53.41, 275.1, 112.01–112.29
See application file for complete search history.

(56) References Cited

U.S. PATENT DOCUMENTS

| | | | | |
|---|---|---|---|---|
| 6,052,344 | A * | 4/2000 | Ueki | 369/53.23 |
| 6,225,638 | B1 | 5/2001 | Togashi et al. | |
| 6,490,237 | B1 | 12/2002 | Supino | |
| 6,975,574 | B2 * | 12/2005 | Yanagawa et al. | 369/53.23 |
| 7,492,685 | B2 * | 2/2009 | Jodorkovsky et al. | 369/53.22 |
| 7,660,221 | B2 * | 2/2010 | Lin | 369/53.22 |
| 7,948,838 | B2 * | 5/2011 | Lee | 369/44.27 |
| 2005/0025017 | A1 * | 2/2005 | Sun | 369/53.23 |
| 2007/0206468 | A1 * | 9/2007 | Takahashi et al. | 369/53.2 |

OTHER PUBLICATIONS

WO 2006/009082 A1, Takahashi et al, "Optical Disk Recording/Reproduction Device and Disk Determination Method for Optical Disk Recording/Reproduction Device", Jan. 26, 2006.*

* cited by examiner

*Primary Examiner* — Tan X Dinh
(74) *Attorney, Agent, or Firm* — Thomas|Kayden (57) ABSTRACT

The invention provides a method for identifying a disk type of an optical disk in an optical disk drive. First, a pickup head of the optical disk drive is moved towards the optical disk. A reflected signal is then observed as said pickup head of the optical drive is moving on the optical disk. A motion behavior is then detected from said reflected signal. A first period between motion initiation of the pickup head and a first peak occurrence of the power of the reflected signal is then determined, the first peak occurrence take places while the pickup head detects said motion behavior of said reflected signal is in accordance with a motion reflected by an polycarbonate layer of the optical disk. A second period between the first peak occurrence and a second peak occurrence of the power of the reflected signal is then determined, the second peak occurrence takes place while the pickup head detects said motion behavior of said reflected signal is in accordance with a motion reflected by an reflection layer of the optical disk. An identification threshold value is then determined according to the first period. The second period is then compared with the identification threshold value to obtain a comparison result. Finally, the disk type of the optical disk is identified according to the comparison result.

16 Claims, 7 Drawing Sheets

METHOD FOR IDENTIFYING OPTICAL DISK TYPE

CROSS REFERENCE TO RELATED APPLICATIONS

This application claims the benefit of U.S. Provisional Application No. 60/827,890, filed Oct. 3, 2006, incorporated herein by reference.

BACKGROUND OF THE INVENTION

1. Field of the Invention

The invention relates to optical disks, and more particularly to disk type identification.

2. Description of the Related Art

When an optical disk is inserted into an optical disk drive, the optical disk drive first has to identify the disk type, after which data of the optical disk can be retrieved accordingly. Different disk types have different distances between polycarbonate layers and reflection layers thereof. A reflection layer forms a reflection surface reflecting a radio frequency signal emitted by a pickup head of an optical disk drive, thus data stored as pits and lands on the reflection surface is read by the pickup head. A polycarbonate layer forms a transparent layer laying over the reflection layer for protection. For example, the distances of CDs, DVDs, and Blu-ray disks are respectively 1.2 mm, 0.6 mm, and 0.1 mm. Consequently, disk type can be identified according to the distance between a polycarbonate layer and a reflection layer of the optical disk.

Figure 1:
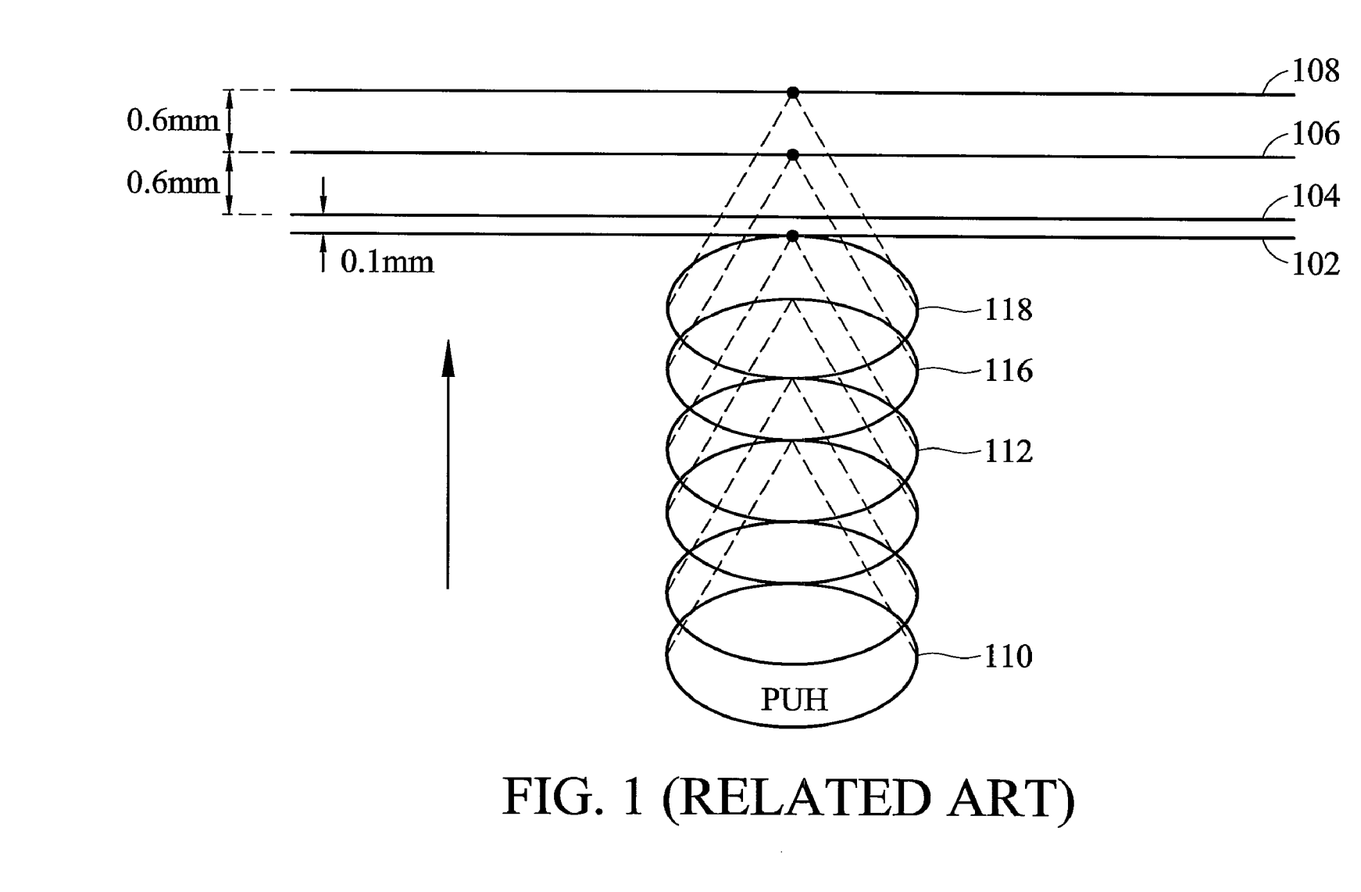
FIG. 1 shows motion of a pickup head during disk type identification.

FIG. 1 is a schematic diagram showing motion of a pickup head during disk type identification. The pickup head projects a radio frequency signal on an optical disk. A surface 102 is the polycarbonate layer surface of the optical disk, and the surfaces 104, 106, and 108 are respectively reflection layer surfaces corresponding to the optical disk of BD, DVD, and CD categories. Thus, the radio frequency signal is first partially reflected by the polycarbonate layer surface 102 to form a first peak in the reflection signal, and then fully reflected by one of the reflection layer surfaces 104, 106, or 108 based on the disk type to form a second peak in the reflection signal.

When the disk identification begins, the pickup head starts to move in a direction perpendicular to the optical disk surface with an initial position 110, progressively approaching the optical disk. When the pickup head moves to the position 112, the pickup head receives the first peak of the reflection signal induced by the polycarbonate layer surface 102. When the pickup head further moves to the position 116, if the optical disk is a DVD, the pickup head receives the second peak of the reflection signal induced by the reflection layer surface 106. If the optical disk is a CD, when the pickup head further moves to the position 118, the pickup head receives the second peak of the reflection signal induced by the reflection layer surface 108. Increased distance between the polycarbonate layer surface 102 and the reflection surface requires more time to move the pickup head from the position 102 to the position 106 or 108. Thus, if the optical disk drive records the period between the first peak occurrence and the second peak occurrence, the disk type can be determined, due to the length of the period reflecting the distance between the polycarbonate layer surface and the reflection layer surface.

Figure 2A:
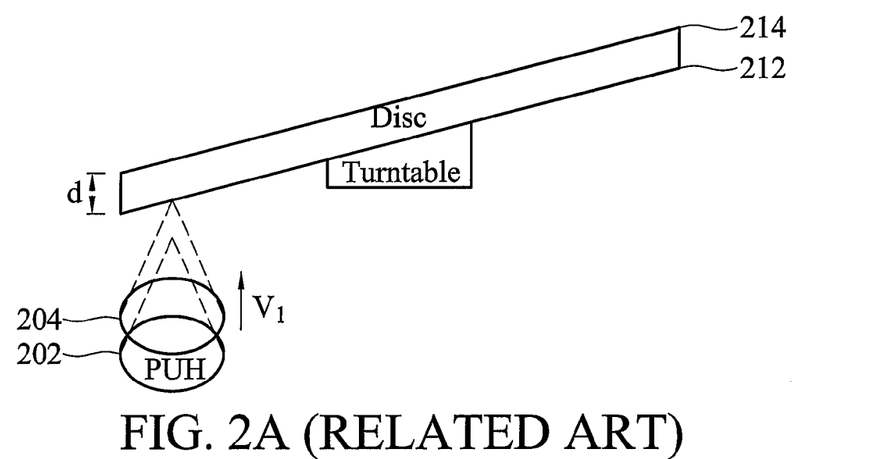
FIG. 2A shows a tilting turntable with pickup head and optical disk separated by a short distance.
Figure 2B:
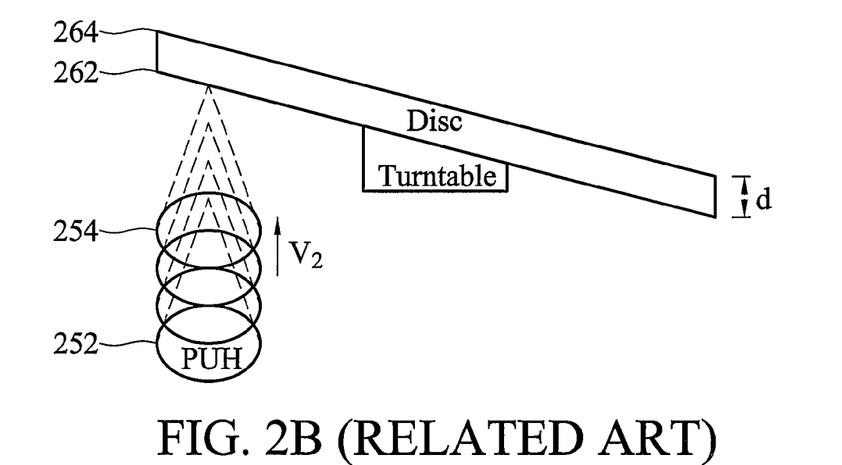
FIG. 2B shows a tilting turntable with pickup head and optical disk separated by a long distance.

The conventional method; however, presents certain problems. When the pickup head moves to the position 112 where the first peak induced by the polycarbonate layer surface 102 occurs, the velocity of the pickup head does not hold on constant due to various reasons such as a tilting turntable loading the optical disk. FIG. 2A shows a tilted turntable with the pickup head and the optical disk separated by a short distance. The pickup head is accelerated from the initial position 202 and a first peak occurs in the reflection signal when the pickup head moves to the position 204. Because the accelerating distance between the initial position 202 and the position 204 is small, the velocity $V_1$ of the pickup head at the position 204 is slow. FIG. 2B shows a tilting turntable with the pickup head and the optical disk separated by a long distance. Because the accelerating distance between the initial position 252 and the position 254 is long, the velocity $V_2$ of the pickup head at the position 254 is high. Thus, although the distances between the layers 212 and 214 and the layers 262 and 264 are both d, the periods between a first peak occurrence and a second peak occurrence are respectively $(d/V_1)$ and $(d/V_2)$, which are not the same.

Other factors may also cause velocity difference of the pickup head. For example, the motion of the pickup head is driven by a focusing actuator signal, if the signal gain or sensitivity of the optical disc drive amplifying the focusing actuator signal is not constant over all optical disk drives due to component deviation, velocities of pickup heads of each drive also differ. Additionally, the distance between the initial position of the pickup head and the turntable varies over the optical disk drives, also causing velocity difference. Furthermore, a various of factors may also effect the accuracy of sensitivity of the optical disc drive, such as the deficiencies of pick-up head, different components, different product manufactures, and etc. . . . Thus, if the same fix threshold is used to compare with the period between a first peak occurrence and a second peak occurrence of the reflection signal to identify disk type, misidentification may occur, causing errors in data reading. A method for identifying disk types of optical disks is therefore required to solve the problem.

BRIEF SUMMARY OF THE INVENTION

The invention provides a method for identifying a disk type of an optical disk. In an embodiment of the method, the optical disk is inserted into an optical disk drive. First, a pickup head of the optical disk drive is moved towards the optical disk. A reflected signal is then observed as said pickup head of the optical drive is moving on the optical disk. A motion behavior is then detected from said reflected signal. A first period between motion initiation of the pickup head and a first peak occurrence of the power of the reflected signal is then determined, wherein the first peak occurrence takes place while the pickup head detects said motion behavior of said reflected signal is in accordance with a motion reflected by an polycarbonate layer of the optical disk. A second period between the first peak occurrence and a second peak occurrence of the power of the reflected signal is then determined, wherein the second peak occurrence takes place while the pickup head detects said motion behavior of said reflected signal is in accordance with a motion reflected by an reflection layer of the optical disk. An identification threshold value is then determined according to the first period. The second period is then compared with the identification threshold value to obtain a comparison result. Finally, the disk type of the optical disk is identified according to the comparison result.

The invention provides an optical disk drive capable of identifying a disk type of an optical disk inserted therein. In an embodiment, the optical disk drive comprises a pickup head and a control module. The pickup head moves towards the optical disk, observing a reflected signal as said pickup head is moving, and detects motion behavior from said reflected signal. The control module first determines a first period between motion initiation of the pickup head and a first peak occurrence of the power of the reflected signal, then a second period between the first peak occurrence and a second peak occurrence of the power of the reflected signal, then determines an identification threshold value according to the first period, then compares the second period with the identification threshold value to obtain a comparison result, and finally identifies the disk type of the optical disk according to the comparison result. The first peak occurrence takes place while the pickup head detects said motion behavior of said reflected signal is in accordance with a motion reflected by a polycarbonate layer of the optical disk, and the second peak occurrence takes place while the pickup head detects said motion behavior of said reflected signal is in accordance with a motion reflected by a reflection layer of the optical disk.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
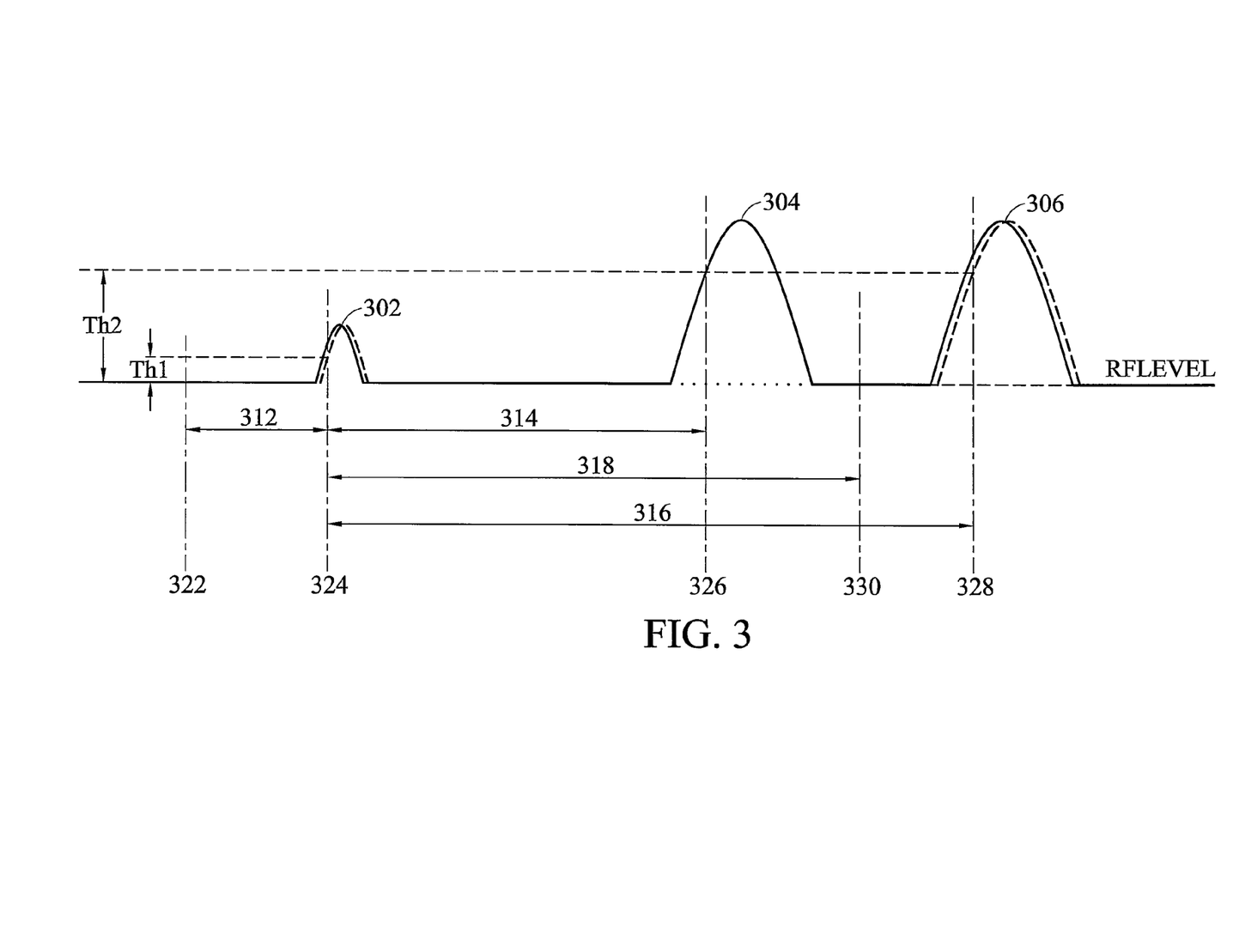
FIG. 3 shows a reflection signal detected by a pickup head when the pickup head moves towards an optical disk.

FIG. 3 shows a reflection signal detected by a pickup head when it moves towards an optical disk. The pickup head starts to move at time 322 with an initial position 110 of FIG. 1. When the pickup head moves to the position 112 of FIG. 1 at time 324, a first peak 302 caused by a polycarbonate layer surface 102 occurs in the power of the reflection signal. When the pickup head further moves to the position 116 of FIG. 1 at time 326, a second peak 304 caused by a DVD reflection layer surface 106 occurs in the power of the reflection signal if the optical disk is a DVD. Otherwise, if the optical disk is a CD, when the pickup head further moves to the position 118 of FIG. 1 at time 328, a second peak 306 caused by a CD reflection layer surface 108 occurs in the power of the reflection signal.

The period 312 between the motion initiation 322 of the pickup head and the occurrence 324 of the first peak 302 is referred to as a first period. Similarly, a period between the occurrence 324 of the first peak 302 and the occurrence of the second peak is referred to as a second period. Thus, the second period indicates the period 314 between times 324 and 326 if the optical disk is a DVD, and the second period indicates the period 316 between times 324 and 328 if the optical disk is a CD. A threshold 330 for identifying whether the optical disk is a DVD or CD can be obtained according to the length of the first period between times 326 and 328, and an identification threshold value 318 indicating the period between the first peak occurrence 324 and the threshold 330 is then determined. If a second period exceeds the identification threshold value 318, the optical disk is identified as a CD, otherwise the optical disk is identified as a DVD. In the conventional method, the identification threshold value 318 is a fix and constant value. In the invention, however, the identification threshold value 318 changes with the length of the first period 312, thus eliminating the problem of disk type misidentification. It should be noted that the second period might start to be measured immediately as the first peak occurs or might start with a little delay after the first peak occurs depend on the design requirements.

Figure 4:
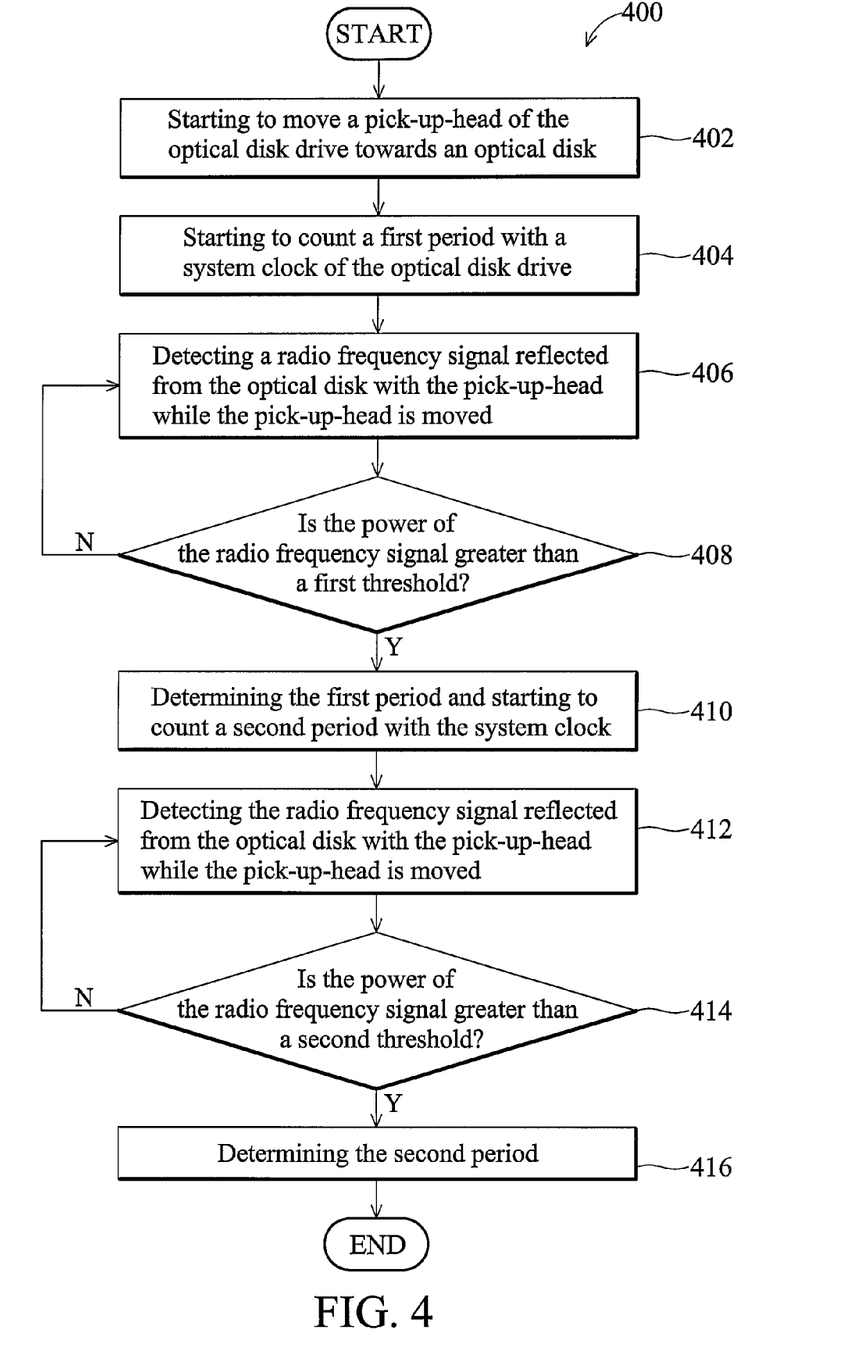
FIG. 4 is a flowchart of a method for determining first period and second period according to the invention.

FIG. 4 is a flowchart of a method 400 for determining the first period 312 and the second period 314 or 316 according to the invention. The pickup head starts to move towards the optical disk at step 402. Concurrently, a control module of the optical disk drive begins calculation of the first period with a system clock of the optical disc drive at step 404. The radio frequency signal reflected from the optical disk is then detected with the pickup head at step 406 while the pickup head is moving. The power of the reflected radio frequency signal is then measured in step 408. If the measured power exceeds a first threshold, a first peak is registered in step 410. The first threshold is a predetermined power threshold for identifying the first peak. An example of the first threshold is the power threshold Th1 shown in FIG. 3. The control module stops calculation of the first period, which is thus determined. Concurrently, the control module begins calculation of a second period. The pickup head continues moving, and the radio frequency signal reflected from the optical disk is still detected by the pickup head at step 412. The power of the reflected radio frequency signal is then measured at step 414. If the measured power exceeds a second threshold, a second peak is registered in step 416. The second threshold is a predetermined power threshold for identifying the second peak, and the second threshold is therefore higher than the first threshold. An example of the second threshold is the power threshold Th2 shown in FIG. 3. The control module stops calculating the second period, and the second period is thus determined. The first and second threshold is the power level for determining whether the measured power is not merely produced by interference.

Figure 5:
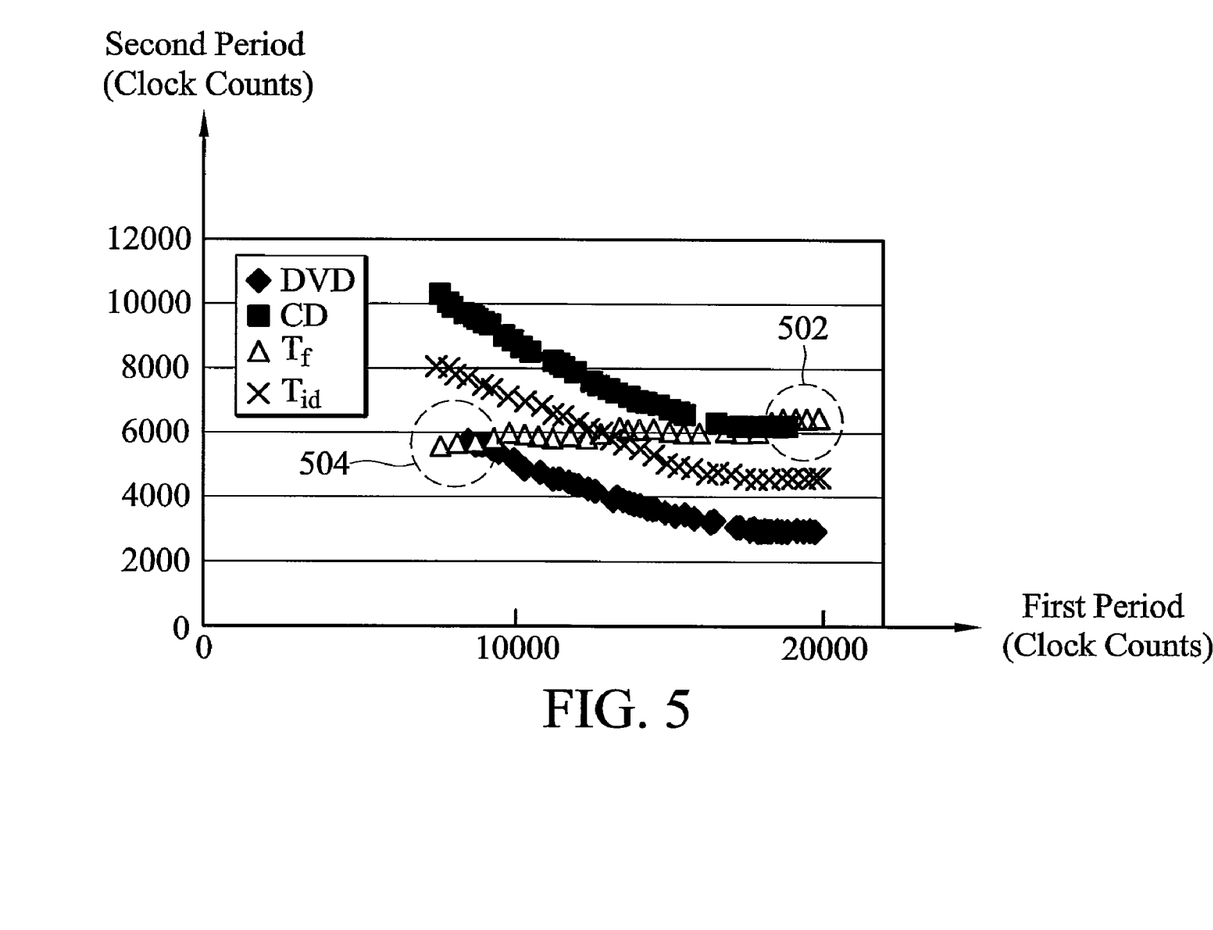
FIG. 5 shows experimental data of a relationship between first period and second period, with an abscissa of the first period and an ordinate of the second period.

After the first period 312 is determined, the identification threshold value 318 is then determined to be used for comparing with the second period. FIG. 5 shows experimental data of the relationship between the first period and the second period. The abscissa of FIG. 5 is the first period measured with the system clock count, and the ordinate of FIG. 5 is the second period measured with the system clock count. As shown in FIG. 2A, the first period during which the pickup head moves from the position 202 to the position 204 is shorter, and the velocity $V_1$ of the pickup head at the position 204 is slower, because the pickup head has less time to accelerate. Thus, the second period ($d/V_1$) is longer. As shown in FIG. 2B, however, the first period during which the pickup head moves from the position 252 to the position 254 is longer, and the velocity $V_2$ of the pickup head at the position 254 is faster, because the pickup head has more time to accelerate. Thus, the second period ($d/V_2$) is shorter.

If the disk type is identified by comparing the second period with a constant and fix threshold value $T_f$ as disclosed the conventional method, misidentification occurs in some situations, such as conditions 502 and 504. In condition 502, a CD is identified as a DVD because the second period is less than the constant identification threshold value $T_f$. In condition 504, a DVD is identified as a CD because the second period exceeds the constant identification threshold value $T_f$. However, if the identification threshold value is adjusted according to the length of the first period, such as the identification threshold value $T_{id}$ shown in FIG. 5, misidentification will be highly reduced, and the optical disk drive is able to correctly identify disk type even under conditions such as 502 and 504.

Figure 7:
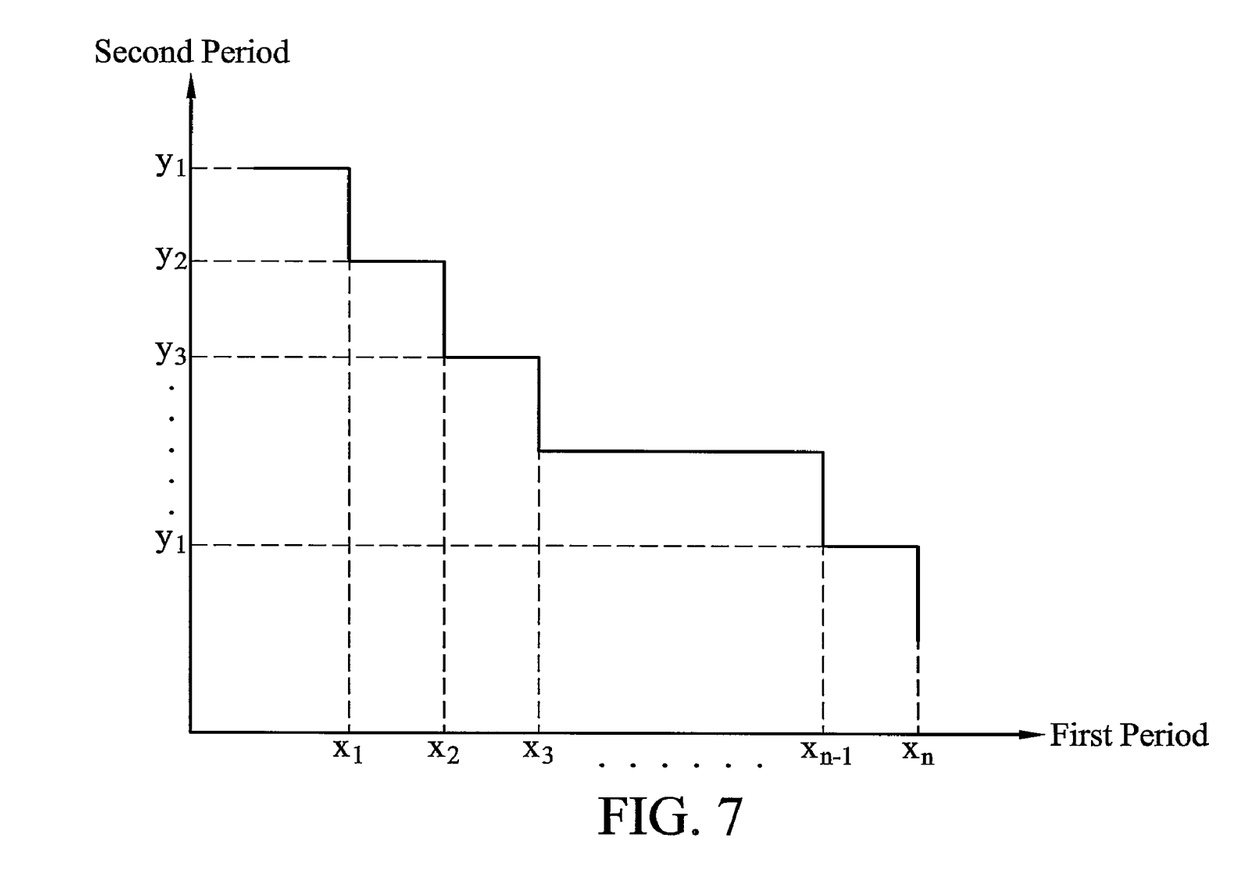
FIG. 7 is a table defining identification threshold value according to a first period.

If the identification threshold value 330 is defined as a predetermined function of the length of the first period in advance, such as the identification threshold value $T_{id}$ of FIG. 5, when a new disk is inserted into an optical disk drive and requires identification, the identification threshold value 330 can be appropriately adjusted according to the length of the first period. In one embodiment, the predetermined function or value can also be implemented in the form of a table defining the identification threshold value according to different length ranges of the first period. FIG. 7 shows a table defining the identification threshold value according to the first period. The length of the first period is divided into multiple length ranges $(0, X_1), (X_1, X_2), \ldots, (X_{n-1}, X_n)$, each of which has a corresponding identification threshold value $Y_1, Y_2, \ldots, Y_n$. Thus, the length range to which the first period belongs is determined, and corresponding identification threshold value is then determined by searching the table according to the length range of the first period.

Figure 6:
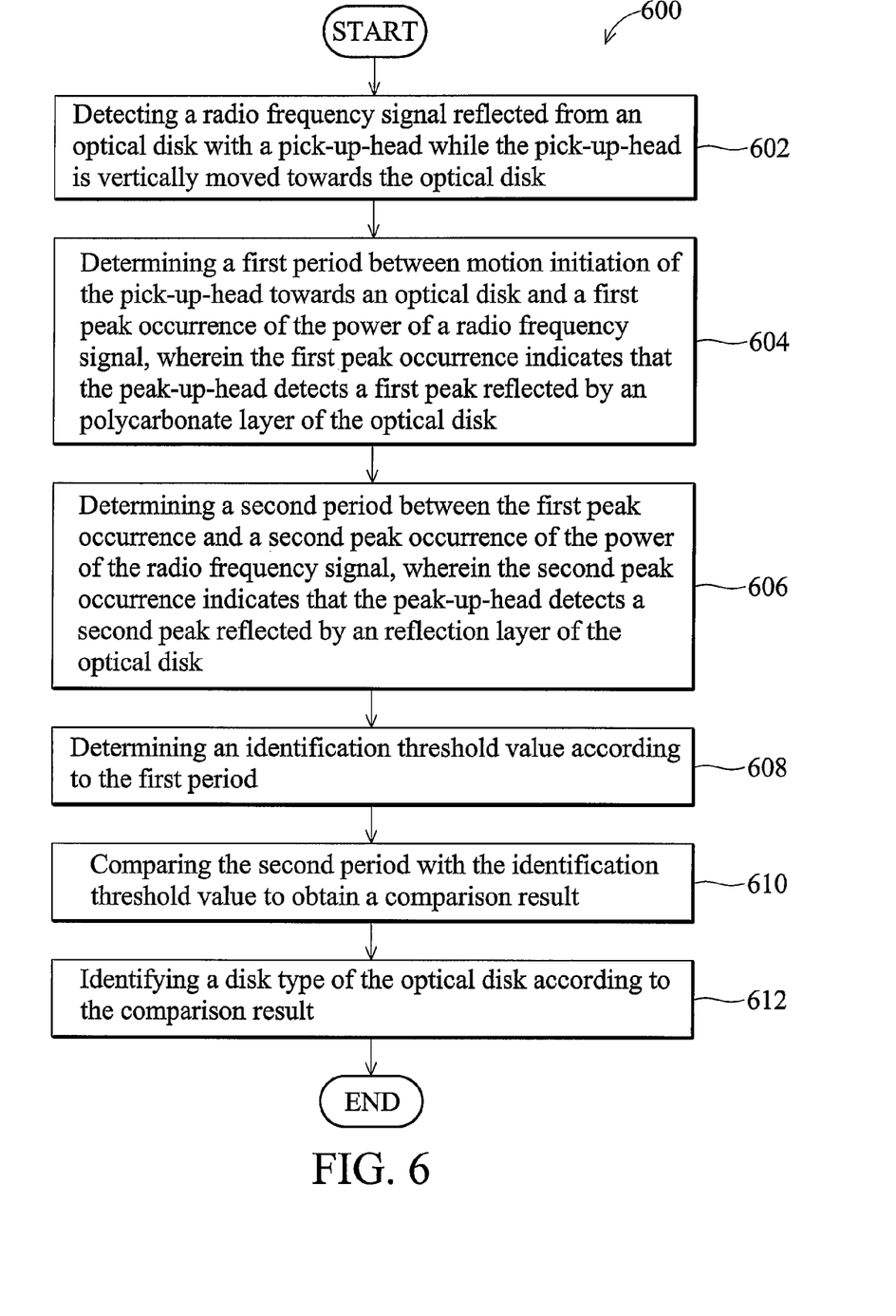
FIG. 6 is a flowchart of a method for identifying a disk type of an optical disk according to the invention.

After the identification threshold value is predetermined as a function of the first period, disk type identification can be accurately made without error. FIG. 6 is a flowchart of a method 600 for identifying a disk type of an optical disk according to the invention. An optical disk is inserted into an optical disk drive, and the optical disk drive identifies the disk type according to the method 600. First, a radio frequency signal reflected from the optical disk is detected with a pickup head of the optical disk drive in step 602 as the pickup head is moved towards the optical disk. A control module of the optical disk then determines a first period 312 between motion initiation 322 of the pickup head and a first peak occurrence 324 of the power of a radio frequency signal at step 604, wherein the first peak occurrence 324 indicates that the pickup head detects a first peak 302 reflected by an polycarbonate layer 102 of the optical disk. The control module then determines a second period between the first peak occurrence 324 and a second peak occurrence of the power of the radio frequency signal at step 606, wherein the second peak occurrence indicates that the pickup head detects a second peak 304 or 306 reflected by a reflection layer 106 or 108 of the optical disk. The first peak and the second peak are determined according to the method 400 as shown FIG. 4.

Because the first period has been determined in step 604, an identification threshold value can be determined according to the length of the first period in step 608. Since the identification threshold value is expressed as a function of the first period, such as in the table of FIG. 7, an appropriate identification threshold value is obtained. Thus, the control module compares the second period determined in step 606 with the appropriate identification threshold value obtained in step 608 to obtain a comparison result at step 610, and the disk type of the optical disk is appropriately identified according to the comparison result without any error.

The invention provides a method for identifying a disk type of an optical disk. A threshold value for identifying the disk type of the optical disk can be adjusted according to a first period during which the pickup head moves from an initial position to a position where a peak of a reflection signal induced by a polycarbonate layer of the optical disk is detected. The threshold is then compared with a second period between the first peak occurrence and a second peak occurrence induced by a reflection layer of the optical disk to identify the disk type of the optical disk. Because the threshold is adjusted with the first period, it considers the velocity factor of the pickup head, eliminating the possibility of misidentification.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for identifying a disk type of an optical disk, wherein the optical disk is inserted into an optical disk drive, the method comprising:

moving a pickup head of the optical disk drive towards the optical disk;

observing a reflected signal as said pickup head of the optical drive is moving on the optical disk;

determining a first period between motion initiation of the pickup head and a first peak occurrence of the power of the reflected signal, wherein the first peak occurrence corresponds to an polycarbonate layer of the optical disk;

determining a second period between the first peak occurrence and a second peak occurrence of the power of the reflected signal, wherein the second peak occurrence corresponds to an reflection layer of the optical disk;

determining an identification threshold value according to a predetermined function which is varied in accordance with a length of the first period;

comparing the second period with the identification threshold value to obtain a comparison result; and identifying the disk type of the optical disk according to the comparison result.

2. The method as claimed in claim 1, wherein determining of the first period further comprises:

starting a measurement of the first period by a system clock of the optical disk drive when the pickup head starts moving;

identifying the first peak according to the power of the reflected signal; and finishing the measurement of the first period when the first peak occurs, whereby the first period is determined.

3. The method as claimed in claim 2, wherein identification of the first peak comprises:

comparing the power of the reflected signal with a first threshold; and confirming occurrence of the first period if the power of the reflected signal exceeds the first threshold.

4. The method as claimed in claim 1, wherein determination of the second period comprises:

starting a measurement of the second period with the system clock of the optical disk drive when the first peak occurs;

identifying the second peak according to the power of the reflected signal; and finishing the measurement of the second period when the second peak occurs, whereby the second period is determined.

5. The method as claimed in claim 4, wherein identification of the second peak comprises:
comparing the power of the reflected signal with a second threshold; and
confirming occurrence of the second period if the power of the reflected signal exceeds the second threshold.

6. The method as claimed in claim 1, wherein the predetermined function is implemented in the form of a table defining the identification threshold value according to different length ranges of the first period, and determination of the identification threshold value comprises:
determining to which length range of the table the first period belongs; and
searching the table for the identification threshold value corresponding to the length range of the first period.

7. The method as claimed in claim 1, wherein the identification threshold value is determined according to a predetermined value, which is varied with a length of the first period.

8. The method as claimed in claim 1, wherein the predetermined value is implemented in the form of a table defining the identification threshold value according to different length ranges of the first period, and determination of the identification threshold value comprises:
determining to which length range of the table the first period belongs; and
searching the table for the identification threshold value corresponding to the length range of the first period.

9. An optical disk drive, capable of identifying a disk type of an optical disk inserted therein, comprising:
a pickup head, moving towards the optical disk, and observing a reflected signal as said pickup head is moving; and
a control module, coupled to the pickup head, determining a first period between motion initiation of the pickup head and a first peak occurrence of the power of the reflected signal, determining a second period between the first peak occurrence and a second peak occurrence of the power of the reflected signal, determining an identification threshold value according to a predetermined function which is varied in accordance with a length of the first period, comparing the second period with the identification threshold value to obtain a comparison result, and identifying the disk type of the optical disk according to the comparison result;
wherein the first peak occurrence corresponds to an polycarbonate layer of the optical disk, and the second peak occurrence corresponds to an reflection layer of the optical disk.

10. The optical disk drive as claimed in claim 8, wherein the control module starts a measurement of the first period with a system clock of the optical disk drive when the pickup head starts moving, identifies the first peak according to the power of the reflected signal, and stops the measurement of the first period when the first peak occurs, whereby the first period is determined.

11. The optical disk drive as claimed in claim 9, wherein the control module compares the power of the reflected signal with a first threshold, and then confirms occurrence of the first period if the power of the reflected signal exceeds the first threshold, thus identifying the first peak.

12. The optical disk drive as claimed in claim 8, wherein the control module starts a measurement of the second period with the system clock of the optical disk drive when the first peak occurs, identifies the second peak according to the power of the reflected signal, and stops the measurement of the second period when the second peak occurs, whereby the second period is determined.

13. The optical disk drive as claimed in claim 11, wherein the control module compares the power of the reflected signal with a second threshold, and then confirms occurrence of the second period if the power of the reflected signal exceeds the second threshold, thereby identifying the second peak.

14. The optical disk drive as claimed in claim 12, wherein the predetermined function is implemented in the form of a table defining the identification threshold value according to different length ranges of the first period, and the control module determines to which length range of the table the first period belongs, and then searches the table for the identification threshold value corresponding to the length range of the first period, thus determining the identification threshold value.

15. The optical disk drive as claimed in claim 8, wherein the control module determines the identification threshold value according to a predetermined value defining the identification threshold value according to a length of the first period.

16. The optical disk drive as claimed in claim 12, wherein the predetermined value is implemented in the form of a table defining the identification threshold value according to different length ranges of the first period, and the control module determines to which length range of the table the first period belongs, and then searches the table for the identification threshold value corresponding to the length range of the first period, thus determining the identification threshold value.

* * * * *